United States Patent [19]

Burgess et al.

[11] Patent Number: 5,072,334
[45] Date of Patent: Dec. 10, 1991

[54] PACKAGE FOR ELECTRICAL COMOPNENTS

[75] Inventors: James P. Burgess, Camarillo, Calif.; Al Vanderstuyf, Novi; Dewey Mobley, Lake Orion, both of Mich.

[73] Assignee: Electro-Wire Products, Inc., Dearborn, Mich.

[21] Appl. No.: 637,790

[22] Filed: Jan. 7, 1991

[51] Int. Cl.$^5$ .............................................. H02B 1/20
[52] U.S. Cl. .................................. 361/428; 174/72 A; 361/394
[58] Field of Search .................. 174/52.2, 72 A, 72 B, 174/153 R; 338/19, 226, 227, 233; 361/394, 428

[56] References Cited
U.S. PATENT DOCUMENTS 3,742,118  6/1973  Myhre et al. ................. 174/52.2
4,423,465  12/1983  Teng-Ching et al. .......... 361/394
4,956,748  9/1990  Yamamoto et al. ........... 361/394

Primary Examiner—Leo P. Picard
Assistant Examiner—Donald A. Sparks
Attorney, Agent, or Firm—Krass & Young

[57] ABSTRACT

A package for electrical components provides for environmentally sealed, internal connection to the component. The package is operative to lock the electrical terminals of the component to terminals associated with external leads. The package further includes a grommet for sealing the interior thereof from ambient conditions.

16 Claims, 4 Drawing Sheets

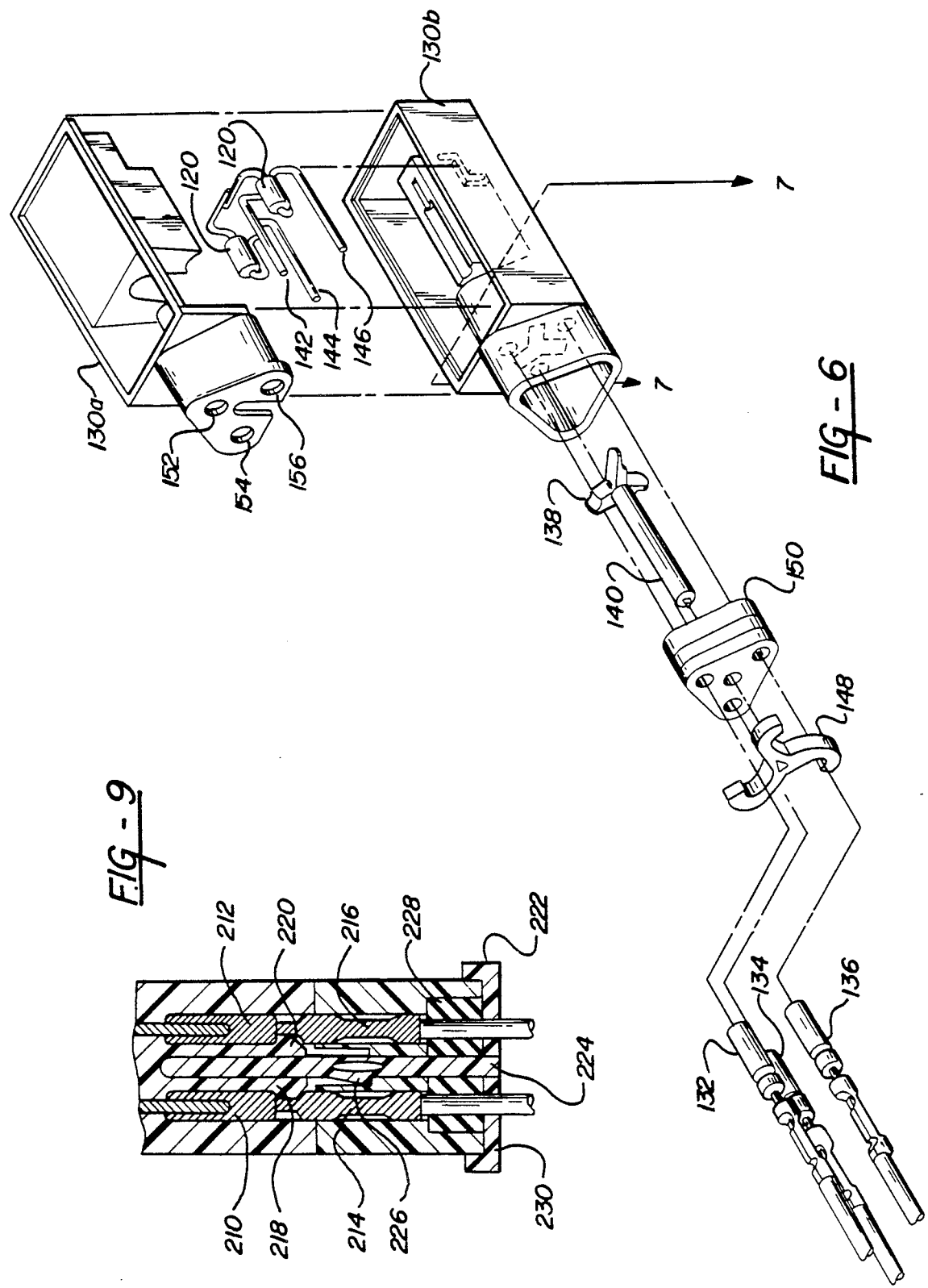

5,072,334

PACKAGE FOR ELECTRICAL COMOPNENTS

FIELD OF THE INVENTION

This invention relates generally to electrical circuits and to circuit elements. More particularly, the present invention relates to electrical circuits including particularly configured plug-in components. Most specifically, the present invention relates to an improved, unitized package for electrical components which has environmentally sealed internal connections. The connector has particular utility in the manufacture of a vehicular wiring harness including environmentally sealed, readily replaceable, plug-in components.

BACKGROUND OF THE INVENTION

Motor vehicles include fairly extensive associated electrical systems and such electrical systems are steadily becoming more sophisticated. The electrical systems of motor vehicles function to operate interior and exterior lighting systems, signals and auxiliary equipment such as windshield wipers, fans, radios, trip computers and the like. Recently, the trend has been to equip motor vehicles with a great number of servo motors for purposes of operating power sun roofs, adjustable mirrors, power windows, door and trunk locks and similar systems. All of these power consuming items are disposed in various locations on the motor vehicle and these items frequently display a wide range of power and/or voltage requirements.

As a result of the foregoing, the electrical systems of most motor vehicles are fairly complex. In addition to the extensive network of wiring, vehicular electrical systems include a great number of other components such as resistors, diodes, capacitors, transistors, fuses, voltage dividers and the like for purposes of providing electrical power having the proper polarity and voltage to the myriad of associated systems.

While it is possible to individually wire each the various components of motor vehicles, such a procedure is very expensive and tends to produce unreliable results. Consequently, manufacturers employ wiring harnesses. These are bundles of electrical wires which are usually color coded and which include necessary resistors, diodes and other circuit elements. The harnesses are prefabricated and installed during the course of the assembly of the vehicle. Because of the ever-growing concern for reliability and quality in the automotive business, manufacturers are now specifying that the resistors, diodes and other circuit elements of a wiring harness be environmentally sealed so as to prevent failure resultant from corrosion of contacts or environmental damage to the electrical component. Typically, such environmental sealing is accomplished by encapsulating the component and its associated wiring by means of heat-shrink tubing or similar material.

While a wiring harness thus fabricated is environmentally protected and ready to install in a motor vehicle, this process is not without its disadvantages. Many components such as diodes and transistors must be installed with proper regard to polarity. If, during the assembly of the harness, one such component is installed in a reversed orientation, the delivered power will not be proper and the energized system will be inoperative and/or damaged. Often times such errors are not discovered until the harness is installed and assembly of the vehicle completed. In such event, the improperly installed electrical component must be replaced, often at great expense and inconvenience. Such "hard wired" harnesses present further problems if a component fails during use since it will then be necessary to cut out the old component, splice in a new component, and reseal the junction. Of course, it is always possible that errors of polarity may be made during such a replacement.

It would clearly be desirable to have a wiring harness including environmentally sealed electrical components wherein inadvertent misinstallation of those components is prevented and replacement of defective components may be accurately and simply accomplished without compromising the environmental seal of the harness.

The present invention provides a package for electronic components having environmentally sealed, internal connections. The package may be readily removed and replaced from a wiring harness or the like. The present invention further includes specific configurations of plug-in electrical components matable with corresponding sockets in a predetermined polarity relationship.

Various configurations of plug-in electrical components have been known in the art for some time; however, such components have not heretofore included internal, environmentally sealed connections thereto, nor have they been incorporated into vehicular wiring harnesses. U.S. Pat. Nos. 2,634,352, 2,784,284, and 2,683,203 all disclose electrical resistors enclosed in a package having protruding, external electrical terminals. None of these patents disclose any configuration of electrical resistors which may be affixed to electrical circuitry in an environmentally sealed manner. Furthermore, none of these patents show any type of vehicular wiring harness. U.S. Pat. No. 3,566,003 discloses a diode configured into a plug-in, fuse-type package for connection to spring clip terminals. This patent does not teach the use of the diode in a vehicular wiring harness nor does it teach a diode package having environmentally sealed, internal connections.

As will be explained in greater detail hereinbelow, the present invention overcomes the problems of the prior art and provides electrical components which are environmentally sealed into an electrical circuit and which are readily replaced therefrom without compromising the seal. These and other advantages of the present invention will be readily apparent from the drawings, discussion, description and claims which follow.

BRIEF DESCRIPTION OF THE INVENTION

There is disclosed herein an environmentally sealed package for electrical components configured to permit the establishment of electrical communication with the component. The package includes a housing which defines an inner chamber interior volume having an access opening therethrough. The package also includes a pair of electrical leads and a first and second electrical terminal supported in electrically isolated relationship by, and within, the housing. The terminals establish electrical communication with the leads of the component and these terminals are engagable with corresponding third and fourth terminals which pass through the access opening. The device may further include externally actuated locking means for maintaining the terminals in mated engagement.

There is also disclosed herein a vehicular wiring harness incorporating the component package. The wiring harness is structured so that the electrical components thereof may be readily installed and/or replaced without compromising the environmental seal of the harness.

BRIEF DESCRIPTION OF THE DRAWINGS

FIG. 6 is an exploded, perspective view of yet another electrical component package structured in accord with the principles of the present invention;

FIG. 9 is a cut away, top plan view of a portion of a component package structured in accord with the present invention and illustrating another terminal locking arrangement.

DETAILED DESCRIPTION OF THE INVENTION

Figure 1:
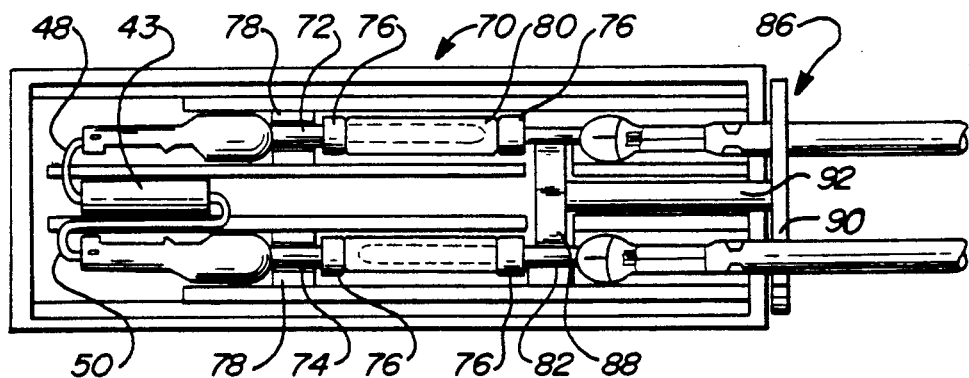
FIG. 1 is a cut-away top plan view of an electrical component package structured in accord with the principles of the present invention.

There are various designs of component packages which may be fabricated in accord with the principles of the present invention, so as to provide for environmentally sealed internal connections. The following designs are illustrative of particular embodiments, others will be apparent to those of skill in the art in view of the teaching herein. Referring now to FIG. 1, there is shown a cut-away, top plan view of a component package 70 structured in accord with the principles of the present invention. The package 70 of FIG. 1 is configured to define an interior volume for housing an electrical component 43. The package further includes a first 72 and second 74 electrical terminal supported by the housing within the interior volume, said terminals in electrical communication with the leads 48,50 of the component 43. In the illustrated embodiment, the first terminal 72 is a male pin-type terminal and the second terminal 74 is a female pin-type terminal. The terminals 72, 74 include a relatively narrow portion and a thicker bead portion 76 near the pin or socket end thereof. The housing 70 is molded to include a rib portion 78 which engages and retains the terminals.

The housing is configured to include an access opening communicating with the interior volume which houses the component 43 and terminals 72,74. The opening is configured to permit passage therethrough of a third 80 and fourth 82 terminal which are matingly engagable with the first 72 and second 74 terminals, respectively. In the illustrated embodiment, the third terminal 80 is a female pin-type terminal and is shown engaged with the first male type terminal 72. The fourth terminal 82 is a male pin-type terminal and is shown engaged with the female terminal 74. The component package 70 further includes a locking mechanism 86 for retaining the corresponding terminals in locked, mated engagement. This particular locking mechanism comprises a locking tab 88 which engages the relatively narrow portions of the third 80 and fourth 82 terminals and operates in cooperation with the bead portions 76 thereof to prevent the terminals from being inadvertently disconnected. The locking tab 88 is rotatable by an actuator lever 90 operating through a linkage 92.

Figure 2:
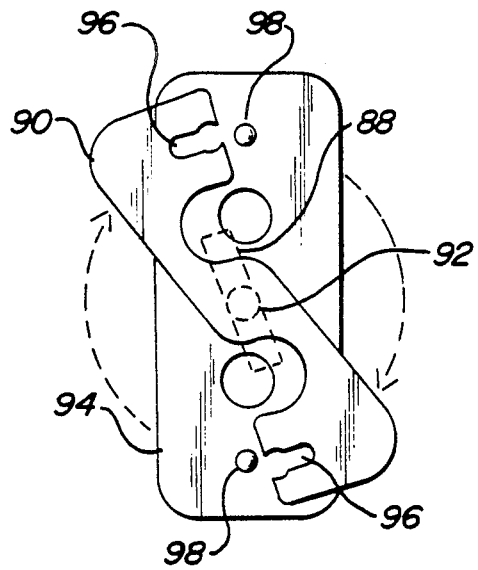
FIG. 2 is an end view of the component package of FIG. 1.
Figure 3:
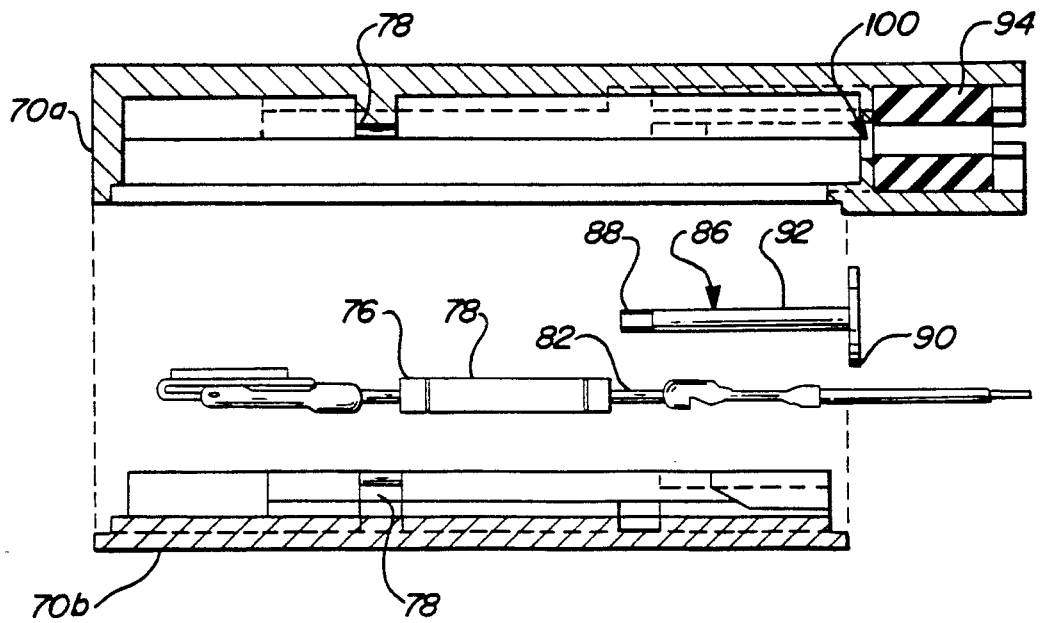
FIG. 3 is a cut-away, exploded view in elevation of the package of FIG. 1.

Referring now to FIG. 2 there is shown an end-on view of the component package 70 of FIG. 1 with the third and fourth terminals removed and better illustrating the action of the actuator 90 and the linkage 92 and tab 88, which are shown herein in phantom outline. It will be noted from FIG. 2 that by rotation of the actuator lever 90, the locking tab 88 is biased in and out of a plane in which the terminals are disposed. As illustrated, the linkage 92 and terminals (not shown in this Figure) pass through a sealing grommet 94 fabricated from silicone rubber or other such elastomeric material and disposed beneath the end face of the package. This grommet 94 protects the interior volume of the component package from ambient conditions. In the FIG. 2 embodiment, the actuator lever 90 includes a pair of notched portions 96 on the ends thereof. These notches are configured to engage a pair of locking pins 98 to prevent inadvertent release of the terminals. Referring now to FIG. 3 there is shown an exploded, elevational view of the component package of FIG. 1. As illustrated, the package includes an upper housing portion 70a and a lower housing portion 70b. The Figure further illustrates the second electrical terminal 74 and the fourth electrical terminal 82 engaged therewith. Also visible in the drawing is the locking mechanism 86 which includes the tab portion 88, actuator linkage 92 and actuator lever 90. It should be noted that the upper 70a and lower 70b portions of the component package include molded-in rib portions 78 which retain the terminals. It should also be noted that the upper portion 70a of the housing includes a passage therethrough 100 configured to permit the tab 88, actuator linkage 92 and terminals 80,82 to pass therethrough and as noted previously, the package is configured to contain a grommet 94 for sealing the interior thereof.

Figure 4A:
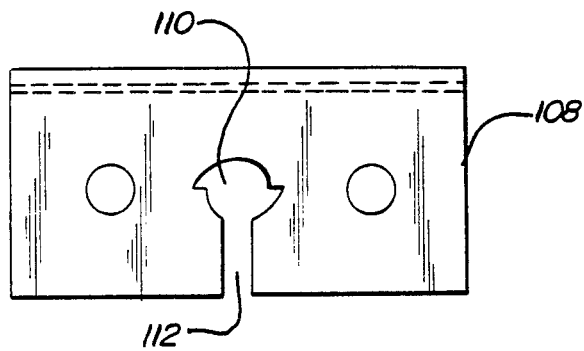
FIG. 4A is an end view of a portion of another component package structured in accord with the principles of the present invention.
Figure 4B:
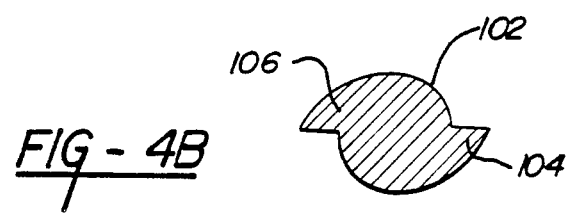
FIG. 4B is a cross-sectional view of a locking shaft for use with the component package of the FIG. 4A embodiment.

Still other variants of the invention may be employed. For example, FIGS. 4A and 4B depict another embodiment of locking mechanism utilizable with the component package of FIGS. 1-3. In this embodiment, the shaft of the actuator linkage is provided with a portion having a non-circular cross section which operates in cooperation with a particularly configured passage in the end of the housing to provide locking. FIG. 4B depicts a cross-sectional view of one such shaft 102 having a pair of locking teeth 108,110 defining camming ramps 104,106 thereon. This shaft fits in a corresponding opening in the end 108 of the housing. As will be noted, the opening 110 is configured to permit the shaft 102 to pass therethrough when it is oriented with the camming ramps 104,106 in a vertical orientation. Rotation of the shaft 102 in a clockwise direction snaps the camming ramps in place and the locking teeth 108,110 retain them against inadvertent removal. In order to rotate the locked shaft back in a counter-clockwise direction it is necessary to pry the opening open by insertion of a screwdriver or other such tool in the narrow portion 112 of the opening 110. This feature may be employed in conjunction with, or instead of the tab 88.

Figure 5A:
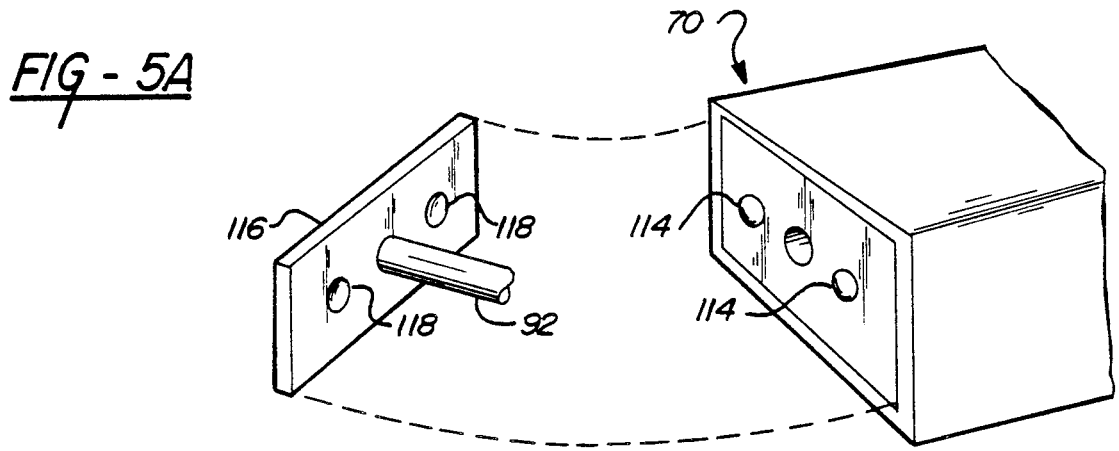
FIG. 5A is an exploded view of a portion of a component package illustrating another embodiment of locking mechanism.
Figure 5B:
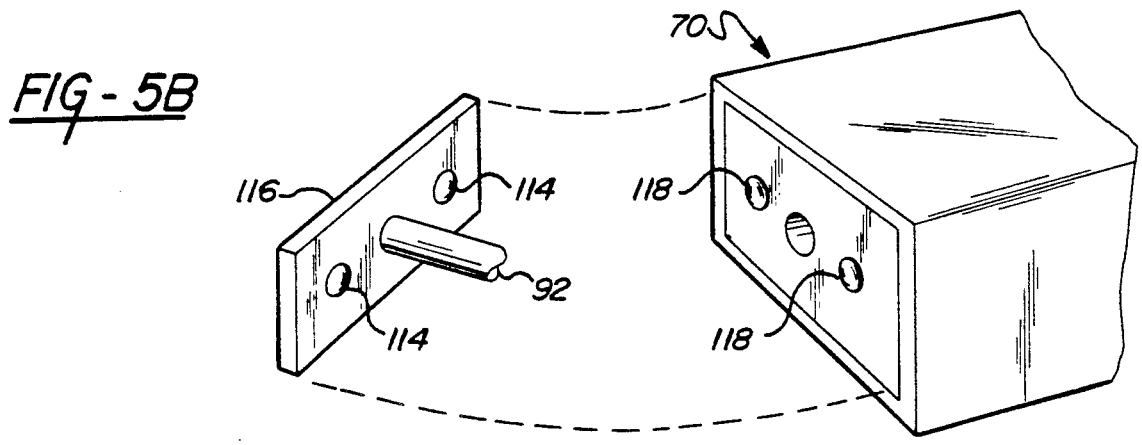
FIG. 5B is an exploded view of a portion of a component package illustrating yet another embodiment of locking mechanism.

FIGS. 5A and 5B depict yet other embodiments of locking means. FIG. 5A is an exploded view of a portion of a component package 70, generally similar to that of FIG. 7. The package includes a pair of protrusions 114 formed on the face thereof. (Although not illustrated, it will be appreciated that the package will also include openings therethrough for passage of electrical device terminals as discussed hereinabove.) The FIG. 5A embodiment also includes an actuator 116, generally similar to that previously described, but including a pair of recesses 118 configured and positioned to engage the protrusions 114. The recesses 118 and protrusions 114 cooperate to retain the actuator 116 and its linkage 92 in a locked position.

FIG. 5B shows an embodiment similar to that of FIG. 5A, but the locations of the protrusions 114 and recesses 118 are reversed. Obviously, there are many other locking mechanisms which may be similarly employed.

The embodiment shown in the foregoing figures is particularly suited for manufacture from a transparent material so as to enable ready inspection of the component and ascertainment of the proper seating of the terminals. A package of this type is particularly suited for use with fuses and other such circuit elements which require visual inspection. Additionally, packages of this type may be utilized for light emitting devices such as diodes, miniature light bulbs and the like.

There are a variety of techniques which may be employed to manufacture the component packages of the present invention. Plastic molding is one technique having particular utility in the fabrication of the component package. The package may advantageously be molded in two separate portions, similar to the two halves shown in the exploded view of FIG. 3. The component package may then be simply assembled by inserting the component and terminals into one-half of the molded package and applying the second half of the package so as to form a closed unit.

There are a great variety of materials which may be employed in the practice of the present invention. The housing for the component package and connector are preferably fabricated from an electrically insulating material which is cheap, durable and easy to fabricate. Synthetic polymeric materials are generally preferred insofar as they meet the foregoing criteria and one could readily select appropriate polymeric materials for use in the present invention. The ideal materials should have sufficient dimensional stability to enable the molding of parts which will maintain the dimensional tolerances. Additionally, the materials should be relatively resistant to ambient atmospheric conditions; and depending upon the particular application, should be resistant to oil, gasoline and other such organic materials. One material having particular utility in the present invention is thermoplastic polyester, reinforced with approximately 15% of glass fiber. Other preferred materials include ABS type polymers, nylon, high density polyethylene and the like.

The terminals are fabricated from an electrically conductive material and they will preferably be fabricated from brass, copper, steel, aluminum and such metals which are easy to work and have good electrical conductivity. Brass and copper are particularly preferred because of their resistance to corrosion; however, steel confers the advantage of being relatively low in cost, durable and easy to fabricate. Steel coated with brass or copper is one other particularly preferred terminal material.

There are obviously, other variations of the present invention which should be apparent in light of the foregoing drawings, description and discussion. For example, while the present invention has been primarily described with reference to two terminal electrical components such as diodes, capacitors and resistors; it may obviously be modified to accommodate three terminal devices such as transistors and the like. In such instance, a third electrical terminal is simply added to the component package and to the connector and this third terminal is connected to the third terminal of the electrical component.

It should be noted that as used herein, the term "electrical component" is meant to refer to discrete elements such as transistors, resistors and the like as well as to electrical circuits including integrated circuits and circuits fabricated from one or more separate devices. In automotive applications it is often necessary to reduce the standard voltage supplied by the automotive electrical system to a lower value to accommodate particular electronic equipment, and such reduction is frequently accomplished by a voltage divider. As is well known to those of skill in the electronic arts, voltage dividers are circuits usually comprised of a plurality of resistors, which operate to reduce an input voltage. Such voltage divider circuitry may be readily enclosed in a component package in accord with the principles disclosed herein.

Referring now to FIG. 6, there is shown yet another component package structured in accord with the principles of the present invention and adapted to provide for internal, environmentally sealed connection to a three terminal electronic component. In this instance, the component is illustrated as being a two element circuit comprised of a pair of diodes 120, it being understood that any similar three terminal component such a diode-resistor package, transistor, SCR or other such device may be similarly packaged. The component package of FIG. 6 is generally similar to that illustrated with reference to the foregoing figures; however, it is particularly configured for three terminal components.

The package of FIG. 6 includes a housing comprised of an upper portion 130a and a matingly engagable lower portion 130b. As in the foregoing embodiment, the housing is configured to support the electrical component and to receive and retain the terminals 132, 134, 136. It will be noted at this point that in this embodiment, the terminals 142,144,146 associated with the component are not separately affixed terminals as shown in the FIG. 1 and 3 embodiments; but rather, the terminals 142,144,146 are integral with and provided by a portion of the electrical leads of the component. In view of the foregoing, it is to be understood that the term "terminal" as employed herein refers to discrete as well as integral terminals.

The component package further includes a locking mechanism particularly adapted for retaining three terminals in locked, mated engagement with electrical components. This locking mechanism for the FIG. 6 embodiment, comprises a three lobed locking tab 138 configured to engage a relatively narrow portion of the terminals 132, 134, 136 and lock them in mated engagement with the three terminals 142, 144, 146 of the components. The locking tab 138 is affixed to, and rotatable by a linkage 140 having associated therewith an actuator 148 (shown detached in this view). The component package further includes a grommet 150 configured to permit passage of the locking tab linkage 140 as well as the electrical terminals 132,134,136 therethrough. This grommet 150 is preferably fabricated from silicone rubber as mentioned herein above.

It will further be noted that the upper portion of the housing 130a and the lower portion of the housing 130b include a triangular shaped end portions thereupon configured to retain the grommet 150 therein. The triangular shaped portion of the upper housing 130a includes a covered end for further protection of the grommet and also includes three openings therein 152, 154, 156 which permit passage of the electrical terminals 132, 134, 136 therethrough and which further provide strain relief for the wire lead portions of the terminals.

Figure 7B:
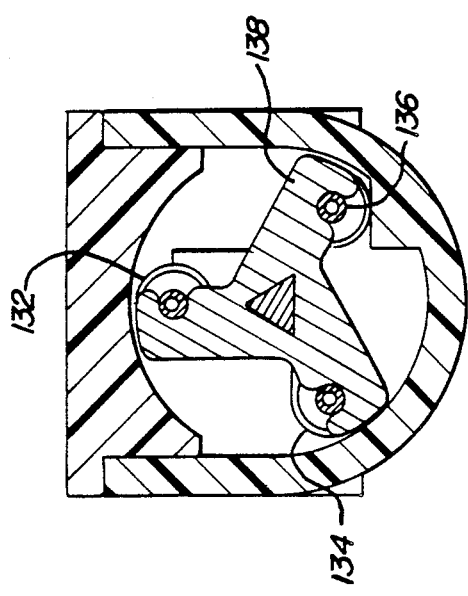
FIG. 7B is a cross-sectional view of the component package of FIG. 6 shown as locked to retain three electrical leads therein.
Figure 7A:
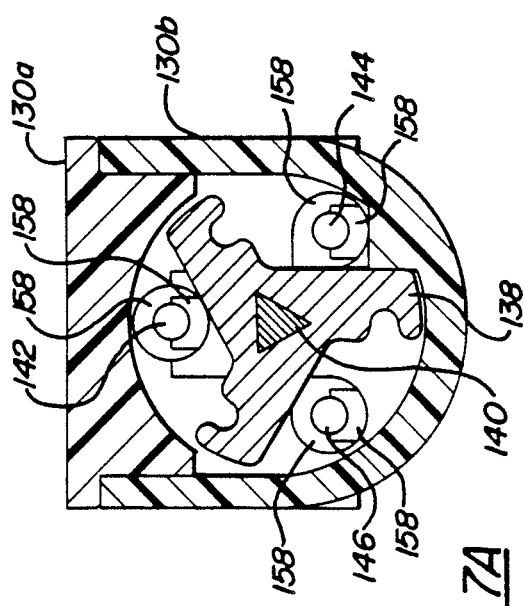
FIG. 7A is a sectional view of the component package of FIG. 6 illustrating the terminal locking means in its unlocked configuration.

The locking mechanism of the FIG. 6 embodiment is better illustrated in FIGS. 7A and 7B. These figures represent the cross-sectional view of the device of FIG. 6 taken along line 7—7. Referring now to FIG. 7A there is shown a cross-sectional view depicting a portion of the upper housing 130a and the lower housing 130b of the FIG. 6 device. Also shown in the locking tab 138 and a portion of the actuator linkage 140. In the FIG. 7A embodiment, the locking tab 138 is shown in its unlocked position and the component package is awaiting receipt of the terminals. The illustration depicts the ribs 158 which hold the terminals 142, 144, 146 of the electrical component.

Referring now to FIG. 7B, there is shown the same component package having the terminals 132, 134, 136 inserted therein and locked into place by the locking tab 138. As noted hereinabove, and with reference to the other embodiments, the terminals 132, 134, 136 each include a relatively narrow portion therein and in this particular embodiment, the locking tab 138 is positioned and configured so as to engage and retain the terminals 132, 134, 136 via the narrowed portion.

Figure 8B:
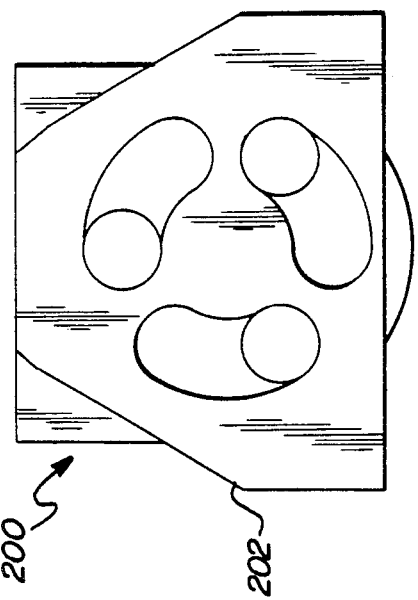
FIG. 8B is an end view of the component package of FIG. 8A shown in its locked configuration.
Figure 8A:
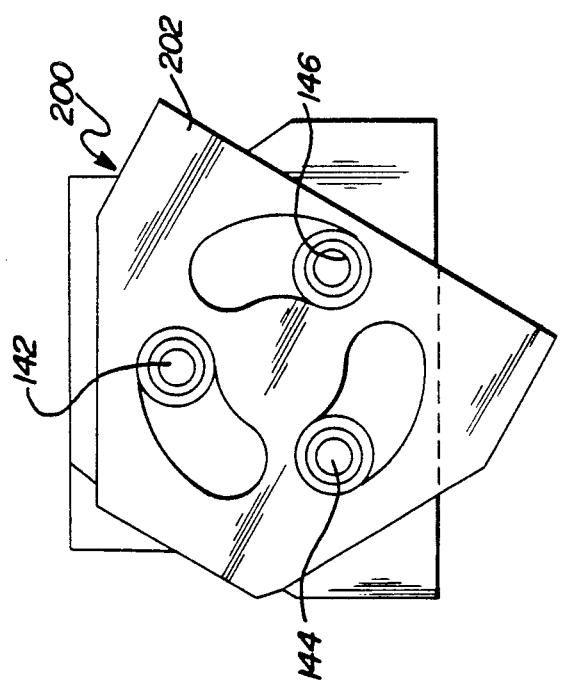
FIG. 8A is an end view of another version of the electrical component package of FIG. 6 shown in its unlocked configuration.

Referring now to 8A and 8B, there is shown yet another embodiment of locking mechanism for a three terminal component package. These figures depict an end view of a component package generally similar to that of FIG. 6 but having a different locking mechanism. As shown in FIG. 8A, the component package 200 includes a rotatable end plate 202 having elongated openings therein configured to receive terminals therethrough. As illustrated, the component package 200 of FIG. 8A is in a configuration analogous to that of FIG. 7A insofar as the terminals 142, 144, 146 of the component are retained by the package 200 awaiting receipt of the connector terminals. Although not shown in FIG. 8A, it is anticipated that this embodiment will include a locking tab similar in form and operation to that illustrated with reference to the preceding figures. As shown in FIG. 8B, the appropriate terminals have been inserted into the component package 200 and the end plate 202 rotated to activate the locking tab to retain the terminals. Obviously, other embodiments of the package may be configured in accord with the principles disclosed herein. Referring now to FIG. 9, there is shown a portion of a component package structured in accord with the principles of the present invention and illustrating another arrangement for locking terminals in place. FIG. 9 illustrates a portion of a component package generally similar to that shown in the foregoing figures and including a first pair of terminals 210, 212 fixedly retained in the package and in electrical communication with a component (not shown). Further illustrated are a second pair of terminals 214, 216 matable with the first pair of terminals 210, 212. In this particular embodiment, the body of the package is configured to define a pair of retaining fingers 218, 220 which include a retaining lug formed thereupon.

At least one surface of the retaining fingers 218, 220 is inclined with relation to the long axis of the component package and this inclined surface faces toward the opening in the package through which terminals are admitted. The locking fingers are resilient and this fact, together with the inclined surface permits the fingers 218, 220 to bend inward when a terminal member (e.g. 214, 216) is inserted. The lugs of the fingers 218, 220 are positioned so as to engage the narrowed portion of the terminals 214, 216. The package further includes a wedge like locking member 222. In the illustrated embodiment, the locking member 222 includes a central stem 224 which fits into the housing and passes between the locking fingers 218, 220 and prevents them from being biased inwardly thereby fixedly retaining the terminals 218, 220 within the housing. In the illustrated embodiment, the stem 224 of the locking member 222 includes a locking tooth 226 disposed so as to engage a portion of the housing and prevent withdrawal of the locking member 222. It will be noted that the stem 224 includes a hollow portion proximate the locking tooth 226 to enable the tooth to be biased inwardly so as to permit passage of the stem 224 into the housing.

It is to be understood that the illustrated embodiment of FIG. 9 depicts a permanently connected i.e., non-reversible, terminal arrangement. The depicted embodiment may be modified to permit simple disconnection of the terminals by eliminating the tooth 226 from the stem 224 or by ramping the forward surface of the tooth 226 to enable withdrawal of the stem 224. Additionally, reversibility of the connection may be further facilitated by configuring the rearward surface of the lugs and the locking fingers 218, 220 as a inclined or ramping surface to permit withdrawal of the terminals past the fingers 218, 220 once the stem 224 of the locking member 222 is removed.

It will be further noted that in the FIG. 9 embodiment, a sealing grommet 228 is included as in the previous embodiments and that the locking member 222 is further configured to provide a front cover portion 230 which permits a passage of the terminals therethrough and which further functions to cover the front of the component package and the associated grommet 228. It is to be understood that other configurations of locking member may be similarly structured in accord with the principles of the present invention.

It is anticipated that the present invention will greatly simplify the manufacture and repair of vehicular wiring harnesses. For example, a harness can be fabricated as a "universal" or "generic" item containing few (if any) components, but including a number of electrical terminals. By appropriately connecting various of the terminals to the appropriate components, and/or to one another, this harness may be configured for an appropriate application. By the use of the component packages of the present invention, environmental degradation of the electrical contact between terminals and components is eliminated, thereby making an approach of this type practical.

The present application finds particular utility in multiplexed vehicular wiring systems. In systems of this type, a common signal wire communicates with a number of actuators which, upon receipt of an appropriate signal, actuate a load device such as a motor, light etc. Each of the actuators typically includes four leads corresponding to the signal wire, ground, power wire and load device. Through the use of the present invention, the electronics of the actuator may be readily encapsulated in a single, readily replaceable package. Use of the present invention allows for the ready repair and reconfiguration of multiplexed vehicular wiring systems and is clearly of great advantage therein.

As mentioned herein above, many electronic devices such as transistors, diodes and integrated circuits require that the current applied thereto be of proper polarity. The present invention allows for maintenance of such polarity by appropriate configuration of the component package and connector socket. Furthermore, the package and connector ma be configured to allow only specific packages to be inserted into specific connectors thereby assuring that all electrical components are placed in their appropriate location. It has further been found desirable to include indicia upon the component package, to indicate which electrical component is inside the package. Such indicia may take the form of color coding, characters, symbols or combinations of the foregoing.

The present invention provides for environmental sealing of an electrical component and its connections thereby eliminating failure resultant from dust, dirt, moisture or corrosion. Use of the present invention ensures that the appropriate electrical device will be installed in a wiring harness and that its proper polarity will be maintained. The invention thus simplifies the manufacture of such harnesses and also simplifies the repair or replacement of electrical components in such harnesses.

It is to be kept in mind that while the present application describes one particular configuration of component package and connector, the particular design of such items will depend upon the particular application and the principles disclosed herein are readily applicable to various configurations of connectors and component packages. It should also be kept in mind that while the present description is primarily oriented toward the fabrication of vehicular wiring harnesses, the invention is not so limited. The principles disclosed herein may be readily adapted for a variety of applications where it is desirable to have readily replaceable electronic components and in particular to those instances that is desirable that such components be environmentally protected. Accordingly, the present invention will have great applicability in the manufacture of communications equipment, testing and measuring equipment, machine controls and the like. Thus the present invention may be practiced in a variety of applications and utilizing variously configured members. Accordingly, the foregoing drawings, discussion and description are merely meant to be illustrative of particular embodiments of the present invention and are not meant to be limitations on the practice thereof. It is the following claims, including all equivalents, which define the scope of the invention.

We claim:

1. A package for providing an environmentally sealed internal connection to an electrical component comprising:

a housing configured to define an interior volume and further configured to define an access opening therethrough, in communication with said interior volume;

an electrical component disposed in said interior volume and including a first and a second electrical lead;

a first electrical terminal supported by said housing, within said interior volume, and in electrical communication with said first lead, said first terminal matingly engagable with a corresponding third terminal;

a second electrical terminal supported by said housing, within said interior volume, and in electrical communication with said second lead, said second terminal matingly engagable with a corresponding fourth terminal;

locking means disposed in said interior volume for locking the first and second terminals in mated engagement with the third and fourth terminals respectively;

a locking means actuator disposed exteriorly of said housing; and an actuator linkage for establishing mechanical communication between the actuator and the locking means, said linkage disposed so as to pass through the access opening in the housing.

2. A package as in claim 1, wherein said actuator linkage includes latch means operative in cooperation with said housing to releasably retain the linkage in a preselected position.

3. A package as in claim 2, wherein said actuator linkage comprises a generally elongated rod and said latch means comprises at least one locking tooth having a camming ramp associated therewith and said housing includes a passage therethrough configured to receive said elongated rod, said passage including a notch configured to engage the locking tooth.

4. A package as in claim 1, further including an elastomeric grommet disposed in said access opening, said grommet configured to seal said opening and including a first and second passage therethrough configured to permit the third and fourth terminals to pass therethrough.

5. A package as in claim 4, wherein said grommet is fabricated from silicone rubber.

6. A package as in claim 4, wherein the electrical component includes a third electrical lead, said package further including a fifth electrical terminal supported by the housing, within the interior volume, and in electrical communication with the third lead, said fifth terminal matingly engagable with a corresponding sixth terminal.

7. A package as in claim 1, wherein said locking means comprises a pair of locking fingers operative to retain said first and second terminals in mated engagement with the third and fourth terminals respectively and wherein said actuator linkage comprises a stem insertable in said housing and operative to prevent movement of the locking fingers.

8. A component package as in claim 7, wherein said locking stem has at least one locking tooth associated therewith.

9. A package as in claim 1, wherein said electrical component is selected from the group consisting essentially of: resistors, diodes, thermistors, threshold switches, fuses, transistors, light emitting devices, switches, relays and combinations thereof.

10. A package as in claim 1, wherein said component is an electrical circuit comprised of a plurality of circuit elements.

11. A package as in claim 1, wherein said first terminal is configured to be matingly engagable only with the third terminal and the second terminal is configured to be matingly engagable only with the fourth terminal whereby proper polarity of electrical power supply to the components may be maintained.

12. A package as in claim 1, wherein at least a portion of the housing thereof is substantially transparent to visible light.

13. A package as in claim 1, further including indicia disposed thereupon, said indicia corresponding to the identity of the electrical component therein.

14. A package as in claim 1, wherein said locking means further includes a locking tab associated therewith.

15. A package as in claim 1, wherein said housing is configured to provide strain relief for an electrical lead associated with one of said terminals.

16. A vehicular wiring harness having a replaceable, environmentally sealed electrical component, said harness including:
a first and a second length of electrically conductive wire;
a first terminal in electrical communication with said first wire;
a second terminal in electrical communication with said second wire;
an electrical component package including third and fourth electrical terminals matingly engagable in electrical communication with said first and second terminals, respectively and further including an electrical component having a first lead electrically connected to the third terminal and a second lead electrically connected to the fourth terminal, said component package defining an interior volume and configured so as to reversibly receive the first and second terminals and maintain them in mated engagement with the third and fourth terminals and to seal the electrical component and the terminals in said interior volume, whereby replacement of the electrical component may be effected by replacement of the component package.

* * * * *